US005379138A

United States Patent [19]

Okada

[11] Patent Number: 5,379,138

[45] Date of Patent: Jan. 3, 1995

[54] BI-STABLE LIQUID CRYSTAL DEVICE AND DRIVING METHOD WHICH ALLOWS FOR TIME VARIABLE THRESHOLD VOLTAGES

[75] Inventor: Shinjiro Okada, Hiratsuka, Japan

[73] Assignee: Canon Kabushiki Kaisha, Tokyo, Japan

[21] Appl. No.: 196,800

[22] Filed: Feb. 15, 1994

Related U.S. Application Data

[63] Continuation of Ser. No. 737,134, Jul. 29, 1991, abandoned.

[30] Foreign Application Priority Data

Jul. 30, 1990 [JP] Japan .................................. 2-199133

[51] Int. Cl.$^{6}$ .............................................. G02F 1/1343

[52] U.S. Cl. .......................................... 359/56; 345/97

[58] Field of Search ............................. 359/56, 84, 55; 340/784; 345/95, 97

[56] References Cited

U.S. PATENT DOCUMENTS

| | | | |
|---|---|---|---|
| 4,561,726 | 12/1985 | Goodby et al. | 350/341 |
| 4,589,996 | 5/1986 | Inoue et al. | 252/299.65 |
| 4,592,858 | 6/1986 | Higuchi et al. | 252/299.66 |
| 4,596,667 | 6/1986 | Inukai et al. | 252/299.65 |
| 4,613,209 | 9/1986 | Goodby et al. | 350/350 |
| 4,614,609 | 9/1986 | Inoue et al. | 252/299.66 |
| 4,681,404 | 7/1987 | Okada et al. | 359/56 |
| 4,707,078 | 11/1987 | Geary | 359/56 X |
| 4,711,531 | 12/1987 | Masubuchi | 359/56 X |
| 4,725,129 | 2/1988 | Kondo et al. | 359/56 |
| 4,747,671 | 5/1988 | Takahashi et al. | 359/56 |
| 4,770,502 | 9/1988 | Kitazima et al. | 359/100 X |
| 4,800,382 | 1/1989 | Okada et al. | 340/784 |
| 4,909,607 | 3/1990 | Ross | 359/56 |
| 4,932,759 | 6/1990 | Toyano et al. | 340/784 |
| 5,047,757 | 9/1991 | Bone et al. | 340/784 |
| 5,151,803 | 9/1992 | Wakita et al. | 359/56 |

FOREIGN PATENT DOCUMENTS

| | | | |
|---|---|---|---|
| 0214857 | 3/1987 | European Pat. Off. . | |
| 61-94023 | 5/1986 | Japan | G02F 1/133 |

OTHER PUBLICATIONS

*Molecular Crystals and Liquid Crystals,* vol. 94, Nos. 1 and 2 (1983), N. A. Clark, et al., "Ferroelectric Liquid Crystal Electro-Optics Using the Surface Stabilized Structure".

*Primary Examiner*—William L. Sikes
*Assistant Examiner*—Ron Trice
*Attorney, Agent, or Firm*—Fitzpatrick, Cella, Harper & Scinto

[57] ABSTRACT

A liquid crystal device is driven by employing a two step writing scheme. In the first step, a pixel is cleared to a second orientation state by a clearing pulse and then a voltage for writing the pixel is applied thereto. In the second step, an additional voltage for writing the pixel is applied thereto. By employing a two step writing scheme, it is possible to compensate for the difference in threshold voltage necessary to write, to a first orientation state, a pixel previously in the first orientation state and a pixel previously in the second orientation state without increasing the time between application of a clearing pulse and a writing signal.

18 Claims, 6 Drawing Sheets

BI-STABLE LIQUID CRYSTAL DEVICE AND DRIVING METHOD WHICH ALLOWS FOR TIME VARIABLE THRESHOLD VOLTAGES

This application is a continuation of application Ser. No. 07/737,134 filed Jul. 29, 1991 now abandoned.

FIELD OF THE INVENTION AND RELATED ART

The present invention relates to a liquid crystal apparatus particularly a ferroelectric liquid crystal apparatus, and a liquid crystal driving method.

Display devices using a ferroelectric liquid crystal have been known, including a type wherein a ferroelectric liquid crystal (hereinafter sometimes abbreviated as "FLC") is injected into a cell or panel formed by disposing a pair of glass plates each having an inner surface provided with a transparent electrode and an aligning treatment opposite to each other so that their inner surfaces face each other with a cell gap of about 1-3 microns therebetween (as disclosed in, e.g., Japanese Laid-Open Patent Application (JP-A) 61-94023).

The above type of display device using a ferroelectric liquid crystal is characterized in that a ferroelectric liquid crystal has a spontaneous polarization causing a coupling with an external electric field available for switching and in that the switching can be caused depending on the polarity of the external electric field because the director ((longer) molecular axis direction) of each FLC molecule corresponds to the direction of its spontaneous polarization in a one-to-one correspondence.

A ferroelectric liquid crystal is generally utilized in its chiral smectic (SmC*, SmH*, etc.) phase so that the liquid crystal molecular axes are disposed to show a twisted alignment in its bulk state but the twisting of the liquid crystal molecular axes can be released or suppressed by disposing the ferroelectric liquid crystal in a cell having a cell gap on the order of 1-3 microns as described above (N. A. Clark, et al., MCLC (1983), Vol. 94, p.p. 213-234).

In an actual FLC cell or panel structure, a simple matrix-structure, e.g., as shown in FIGS. 3A and 3B may be adopted.

Referring to FIGS. 3A and 3B, such an FLC cell or panel has a sectional structure as shown in FIG. 3B and includes a pair of upper and lower glass substrates 31 each having ITO stripe electrodes 32, an $SiO_2$ insulating film 33 and a polyimide alignment film 34 disposed in this order thereon, a ferroelectric liquid crystal 36 disposed between the substrates, and a sealing member 35 sealing the periphery of the cell structure. The ITO stripe electrodes 32 are disposed on one substrate 31, e.g., in a pattern as shown in FIG. 3B, so as to intersect with the stripe electrodes 32 on the other substrate 31.

For matrix drive of FLC display devices, a line-sequential scanning scheme has been conventionally adopted, wherein an identical writing waveform is applied for providing one display state to a pixel regardless of whether the pixel has had either one of bistable molecular orientation states.

In actual drive, however, it has been found that a state before a writing remarkably affects the threshold for the writing.

More specifically, if it is assumed that $V_{thW}$ denotes a threshold for writing "white" in a "white" pixel after once clearing the pixel into "black" and $V_{thB}$ denotes a threshold for writing "white" in a "black" pixel after once clearing the pixel into "black", a relationship of $V_{thB}>V_{thW}$ exhibits until a certain relaxation time lapses since the clearing into "black".

Based on the phenomenon, when a drive voltage in the vicinity of the threshold is applied, the resultant display state can be different depending on whether the pixel in question has been in the "white" state or "black" state before the writing. This is quite awkward for a display device.

Further, in the case of displaying a halftone in a pixel for the purpose of a gradational display by voltage modulation, it is inevitable to set a voltage in the vicinity of the threshold depending on a pixel state before the writing, and the adverse effect of the phenomenon is serious. If the adverse effect is avoided by placing a wait time before the writing, a motion picture lacks its continuity, or a picture flickers in the case of a refresh drive.

SUMMARY OF THE INVENTION

In view of the above-mentioned problems of the prior art, an object of the present invention is to provide a liquid crystal driving apparatus and a liquid crystal driving method capable of desired writing stably and reliably regardless of pixel state before the writing.

Another object of the present invention is to provide a liquid crystal driving apparatus and a liquid crystal driving method capable of immediate writing without having a wait time corresponding to the above-mentioned relaxation time.

According to the present invention, there is provided a liquid crystal driving method, comprising:

providing a liquid crystal device comprising a plurality of scanning electrodes, a plurality of data electrodes intersecting the scanning electrodes, and a bistable liquid crystal showing a first stable orientation state and a second stable orientation state disposed between the scanning electrodes and the data electrodes so as to form a pixel at each intersection of the scanning electrodes and the data electrodes, and writing steps for causing the first orientation state in a pixel including:

a first step of applying a prescribed voltage for causing the second orientation state to the pixel and then applying a voltage of at least $V_1$ to the pixel, and a second step of applying a voltage of at least $V_2$ to the pixel, wherein $V_1$ denotes a threshold voltage required for converting a pixel in the second orientation state into the first orientation state after applying the prescribed voltage for causing the second orientation state to the pixel in the first orientation state, and $V_2$ denotes a threshold voltage required for converting a pixel in the second orientation state into the first orientation state after applying the prescribed voltage for causing the second orientation state to the pixel in the second orientation state. Preferably, the first step is performed at a time when $V_1<V_2$ and the second step is performed at a time when $V_1$ and $V_2$ are substantially identical to each other.

According to Another aspect of the present invention, there is provided a liquid crystal driving method, comprising:

providing a liquid crystal device comprising a plurality of scanning electrodes, a plurality of data electrodes intersecting the scanning electrodes, and a bistable liquid crystal showing a first stable orientation state and a second stable orientation state disposed between the scanning electrodes and the data electrodes so as to form a pixel capable of forming a gradation state depending on a voltage applied thereto at each intersection of the scanning electrodes and the data electrodes, and writing steps for causing a gradation level k in a pixel including:

a first step of applying a prescribed voltage for causing the second orientation state to the pixel and then applying a voltage of Va to the pixel, and a second step of applying a voltage of Vb to the pixel, wherein Va denotes a voltage required for converting a pixel completely in the second orientation state into the gradation level k after applying the prescribed voltage for causing the second orientation state to the pixel completely in the first orientation state, and Vb denotes a voltage required for converting a pixel completely in the second orientation state into the gradation level k after applying the prescribed voltage for causing the second orientation state to the pixel completely in the second orientation state. Preferably, the first step is performed at a time when Va<Vb and the second step is performed at a time when Va and Vb are substantially identical to each other.

According to still another aspect of the present invention, there are provided a liquid crystal driving apparatus including the liquid crystal devices and drive means suitable for performing the above-mentioned first and second steps.

These and other objects, features and advantages of the present invention will become more apparent upon consideration of the following description of the preferred embodiments of the present invention taken in conjunction with the accompanying

DETAILED DESCRIPTION OF THE PREFERRED EMBODIMENTS

Figure 1:
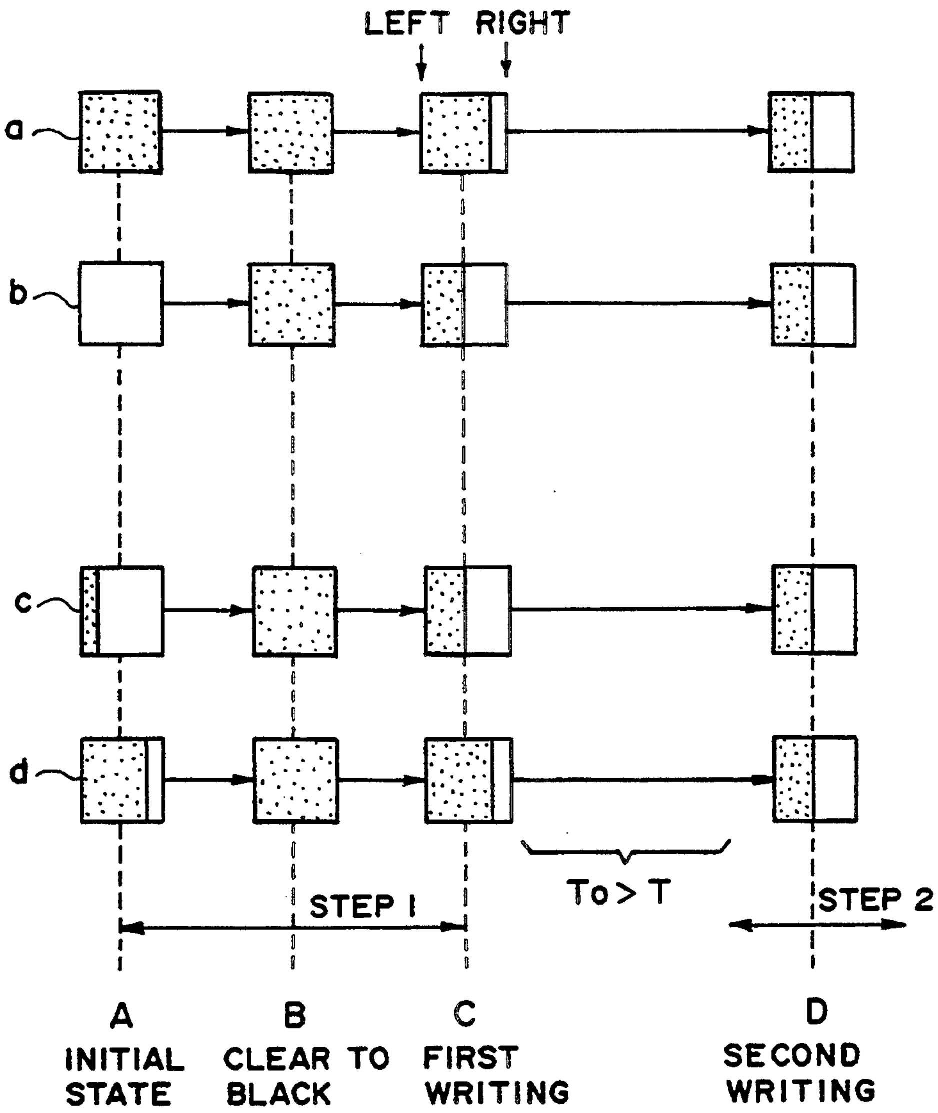
FIG. 1 is a schematic view for illustrating an embodiment of the liquid crystal driving method according to the present invention.

According to the present invention, voltage signals applied to the respective pixels of the liquid crystal device are divided and consecutively applied in steps 1 and 2, respectively, so that a desired state is reliably displayed in each pixel regardless of the state of the pixel before the writing.

Particularly, in the case of a gradational display, a desired gradation level is stably written in the respective pixels without being affected by the previous state of each pixel. Further, a gradational state close to the desired level can be accomplished by performing the step 1 without having a wait time corresponding to the relaxation time in which the writing threshold affected by the previous states become substantially the same. Accordingly, it is possible to provide the display with a continuity, which is suitably applicable to a motion picture display and which is free from flickering in case of refresh drive.

In the display device used in the present invention, a plurality of scanning electrodes and a plurality of data electrodes are disposed to intersect each other so as to receive the respective signals, and a liquid crystal showing a first orientation state and a second orientation state is disposed between the two types of electrodes so as to form a pixel at each intersection of the scanning electrodes and the data electrodes. The liquid crystal at each pixel is driven between the first and second orientation states. In order to provide the first orientation state at a certain pixel, the pixel is first supplied with a voltage sufficient to cause the second orientation state and then supplied with a voltage of at least $V_1$ which is a threshold voltage for converting a pixel in the second orientation state into the first orientation state after applying a clearing voltage for causing the second orientation state to the pixel in the first orientation state (Step 1), and then supplied with a voltage of at least $V_2$ which is a threshold voltage for converting a pixel in the second orientation state into the first orientation state after applying a clearing voltage for causing the second orientation state to the pixel in the second orientation state (Second step). As a result, in the first step, a pixel in the first orientation state is securely brought to the first orientation state and, in the second step, a pixel in the second orientation state is securely brought to the first orientation state even when the pixel is not brought to the first orientation state in the first step.

In the case of a gradational display, in order to provide a desired gradation level K at a certain pixel, the pixel is first supplied with a voltage sufficient to cause the second orientation state completely and then supplied with a voltage Va which is a voltage capable of providing the gradation level K to a pixel completely in the second orientation state after applying a clearing voltage for causing the second orientation state to the pixel in the first orientation state (Step 1), and then supplied with a voltage Vb which is a voltage capable of providing the gradation level K to a pixel completely in the second orientation state after applying a clearing voltage for causing the second orientation to the pixel in the second orientation state (Step 2). As a result, in the case where the certain pixel is at the gradation level K or closer to the complete first orientation state, the pixel is brought to the gradation level K in the first orientation state. On the other hand, in the case where the certain pixel is between the gradation level K and the complete second orientation state, the pixel is securely brought to the gradation level K in the second step even if the gradation level K is not provided in the first orientation state and remains to be between the gradation level K and the complete second orientation state. In the step 2, Va and Vb are ordinarily almost the same or closer to each other, a pixel at the gradation level K already in the first step does not change the gradation level. As a result, a desired gradation level can be stably written in a pixel without being affected by a previous display state of the pixel. Further, the step 1 may be performed to obtain a gradation level close to the desired gradation level without having a wait time within which Va and Vb become substantially the same value. Accordingly, the display is caused to acquire a continuity, thus being suitable for a motion picture display and free from flickering in the case of refresh drive.

In the present invention, the first and second steps may be performed in this order one by one in two successive scanning times.

The liquid crystal suitably used in the present invention may comprise a ferroelectric liquid crystal. As the ferroelectric liquid crystal, a liquid crystal compound or composition showing chiral smectic phase as disclosed in U.S. Pat. Nos. 4,561,726, 4,614,609, 4,589,996, 4,592,858, 4,596,667, 4,613,209, etc., may be used.

Hereinbelow, some embodiments of the present invention will be described with reference to the drawings.

First Embodiment

In specific example, a ferroelectric liquid crystal device was prepared in the following manner. An electrode plate was provided by coating a polished glass substrate with an ITO film having a sheet resistivity of about 40 ohm./square by sputtering. Each electrode plate was further coated with a polyimide precursor liquid ("LQ-1802", mfd. by Hitachi Kasei K.K.), followed by curing and rubbing in one direction with a nylon fiber (about 0.3 mm-long)-planted cloth to form a polyimide-type alignment film.

A pair of the glass plates thus provided were fixed to each other so that their rubbing directions are identical to form a blank cell with a cell gap of about 1.4 micron. The blank cell was then filled with a liquid crystal A having a Ps (spontaneous polarization) of 6.6 $nC/cm^2$, $\Delta\epsilon$ (dielectric anisotropy) of $-0.3$ and a tilt angle of 14.3 degrees, respectively at 30° C., and showing the following phase transition series:

Phase transition series (° C.)

$$\text{Cryst.} \underset{-12.1}{\overset{-4.1}{\rightleftarrows}} \text{SmC*} \overset{53.3}{\longrightarrow} \text{SmA} \underset{77.8}{\overset{78.2}{\rightleftarrows}} \text{Ch.} \underset{83.9}{\overset{83.4}{\rightleftarrows}} \text{Iso.}$$

Cryst.: crystal,
SmC*: chiral smectic C phase,
SmA: smectic A phase,
Ch.: cholesteric phase, and
Iso.: isotropic phase.

The cell filled with the liquid crystal A heated in its isotropic phase was gradually cooled for alignment to form a liquid crystal device (cell or panel).

Figure 4:
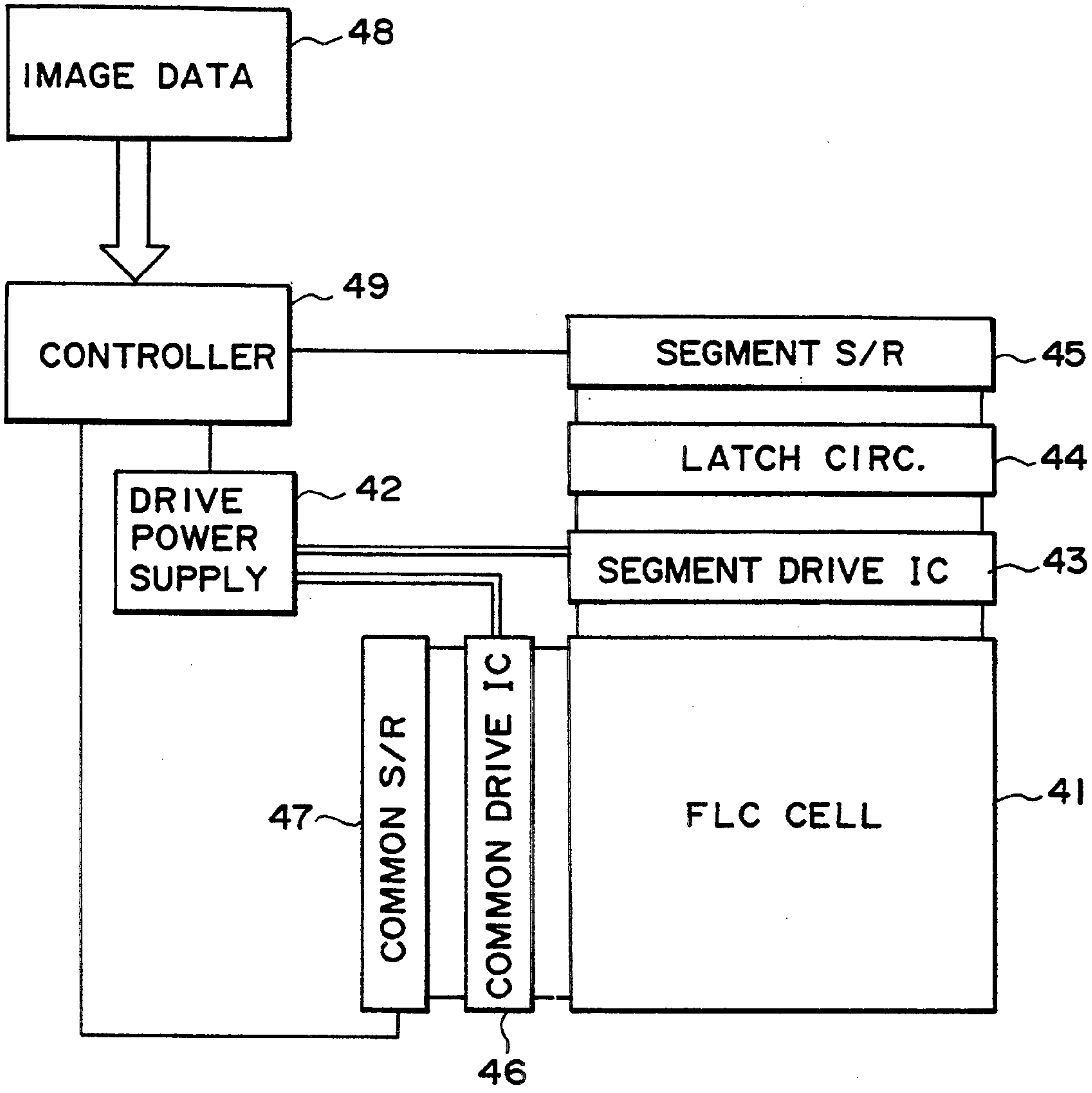
FIG. 4 is a block diagram of a drive circuit for generating drive signals for performing the liquid crystal driving method according to the present invention.

FIG. 4 is a block diagram of an embodiment of the liquid crystal apparatus according to the present invention including a liquid crystal cell or panel 41 thus prepared and a drive circuit therefor, which includes a drive power supply 42 for generating voltages supplied to the liquid crystal cell 41, segment-side drive IC 43 for applying voltages from the drive power supply 42 to data signal lines of the liquid crystal cell 41 as image data signals, a latch circuit 44, a segment-side S/R (shift register) 45, a common-side drive IC for applying a voltage from the drive power supply 42 to scanning signal lines of the liquid crystal cell 41 as a scanning signal, a common side S/R (shift register) 47, an image data source 48, and a controller 49 for controlling the segment-side S/R 45 and the common-side S/R 47 based on image data from the image data source 48.

Figure 5:
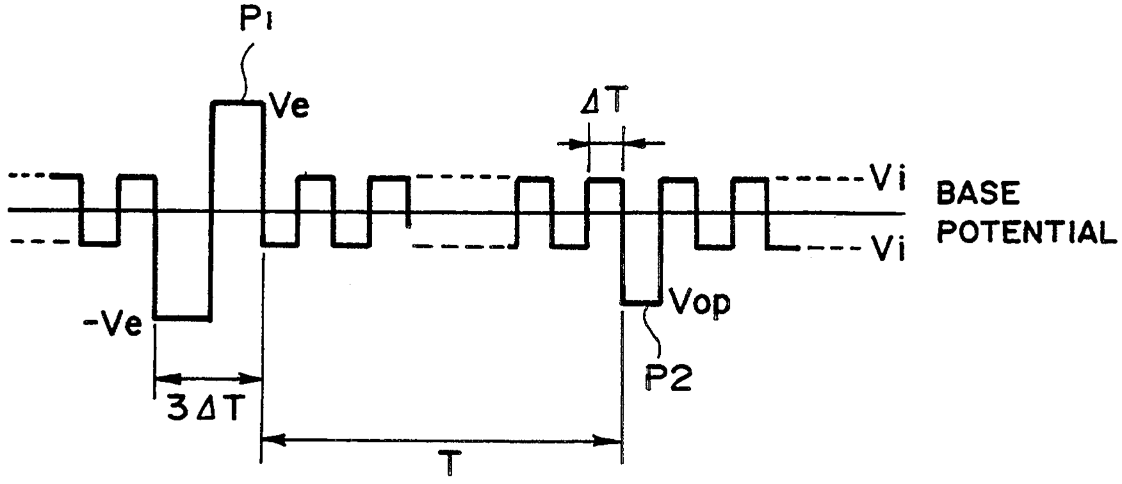
FIG. 5 is a waveform diagram showing an example of a driving waveform applied to a pixel for performing the liquid crystal driving method according to the present invention.

FIG. 5 shows an example of a voltage signal (pixel signal) waveform conventionally applied to a pixel of the liquid crystal cell 41 according to the above arrangement. As a result, there can result in a difference in writing threshold depending on whether a pixel to be written is in a "white" state or a "black" state before the writing. FIG. 5 shows a waveform for clearing a pixel into "black" and then writing the pixel into "white", including a clearing pulse P1 into "black" and a writing pulse P2 for "white". Herein, the parameters are set such that $\Delta T=40$ μsec, $Vi=6.2$ volts, $T=200$ μsec and $Ve=26.0$ volts. Vop denotes a prescribed switching voltage. In the period T, data signals for other scanning lines are applied.

Figure 6:
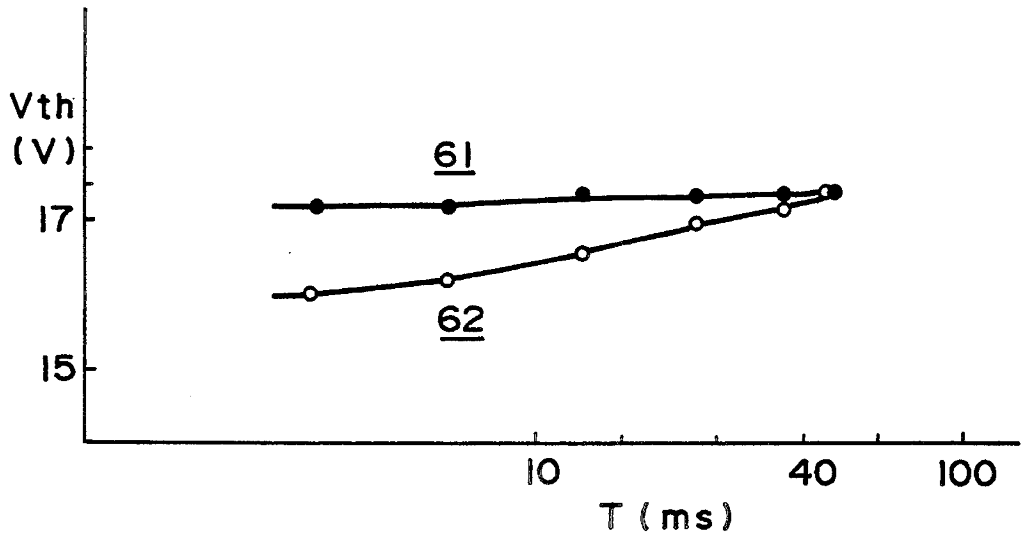
FIG. 6 is a graph showing a change with time of a difference in switching threshold of a ferroelectric liquid crystal depending on a difference in state before writing.

In the case of FIG. 5, the switching threshold $V_{th}$ may cause changes as shown in FIG. 6 depending on the length of the period T. Referring to FIG. 6, the curve 61 connecting black spots (●) represents a change in threshold $V_{thB}$ for clearing a pixel in "black" state before writing into "black" and then writing "white", and the curve 62 connecting white spots (o) represents a change in threshold $V_{thW}$ for clearing a pixel in "white" state before writing into "black" and then writing "white". As is understood from FIG. 6, a relationship of $V_{thB}-V_{thW}>1.0$ holds for a relatively short period T. The difference in threshold cannot be ignored for writing by application of voltages in the neighborhood of the threshold and leads to a difficulty in display of gradation levels. A period T of about 44 msec is required in order that the difference between $V_{thB}$ and $V_{thW}$ can be ignored. During the period, flickering is caused even in a refresh drive, giving rise to a difficulty in a display device. Further, in the case of a gradational display, the difference can result in display gradation level amounting to about 5-10%.

In order to obviate the above-mentioned difficulties, a voltage application method including two steps is adopted in this embodiment as will be explained with reference to FIG. 1. FIG. 1 is a schematic view for illustrating a transition of states of four pixels a–d having different initial states. From the left to right in FIG. 1, at A are shown initial states, at B are shown states after clearing into "black", at C are shown states after a first writing, and at D are shown states after a second writing for the pixels a–d, respectively. The pixels a–d are respectively assumed to have a square region having a threshold gradually increasing from the left side toward the right side. Such a threshold change within a pixel may be caused according a cell gap change within the range of 1.0–1.4 micron for a pixel.

This embodiment is constituted by two steps including a first step of from clearing into "black" up to application of a gradation data signal for the first time, and a second step of applying a gradation data signal for the second time. This results in differences as shown at C after the first writing of gradation data signals depending on the initial states before writing of the pixels at a–d.

Now, a first-time gradation data signal is assumed to be an inversion signal for causing an inversion of, e.g., 50% of a pixel. In the first step (step 1), a clearing pulse $P_1$ (Ve=26.0 volts) similar to the one shown in FIG. 5 for clearing into or toward "black" to form a state B and then, after a period of T=200 μsec., a white-writing pulse $P_2$ (Vop=13.7 volts) to effect a writing. In this instance, the pixels having the initial states b and c are completely written with intended data, whereas the pixels having the initial states a and d provide incompletely written states. This is a result of influence of a difference in threshold caused by a difference in state of pixels before writing as has been described hereinbefore.

After the step 1, a writing (rewriting) in a second step (step 2) is performed after a lapse of time $T_O$ which is larger than a relaxation time T of approximately 44 sec (beyond which a difference in threshold disappears). In the step 2, the pixels a–d are initially at the states C. In this rewriting step, it is possible to either apply or not apply a clearing pulse for providing the states B, and the writing signal may have a switching threshold Vop (15.0 volts) from the "black" state.

As a result of the above-described writing, even the pixels having the initial states a and d are completely written with 50%-inversion data. In this instance, the pixels having the initials b and c which have been already written with complete gradation data also have the same switching threshold from the "black" state with respect to their black-written regions. As a result, all the pixels a–d are written at the same intended gradation level.

According to this embodiment as described above, an intended gradation state can be displayed without depending on different initial states before writing by consecutively applying two voltage application steps of the step 1 and the step 2. Further, even at a stage after the step 1, the gradation data are written to some extent, so that the display can be provided with a continuity and may be applicable to a motion picture display compared with the case where a whole picture or screen is allowed to stand at the initial state of "white" or "black" for the above-mentioned relaxation time T.

In other words, compared with a conventional scheme wherein a standing time of 40 msec or longer is required for clearing to writing, the standing time can be reduced to an order of microseconds or substantially omitted according to this embodiment. Further, if the steps 1 and 2 are divided into two consecutive frames each comprising scanning of all the scanning lines, an intended graditional picture can be displayed with an error of about 10% in a step 1, followed by a step 2 providing a completely intended gradational picture free of error. In this instance, if the above frame scanning time is assumed to be 100 msec, for example, the influence of the previous pixel states can be completely removed if the above-mentioned relaxation time is 100 msec or shorter.

Further, even in a case where the relaxation time exceeds 100 msec., and the frame scanning time is shorter than the relaxation time (while this is not ideal), a much better display quality can be accomplished than in a conventional system wherein the pixels are merely caused to stand in a refresh operation.

In the above described embodiment, pixels b and c having a lower threshold voltage for the desired gradation level are written in Step 1, but it is also possible to write pixels a and d having a higher threshold voltage for the desired gradation level in Step 1 if an additional step of clearing into "black" is placed before Step 2.

Second Embodiment

Figure 2A:
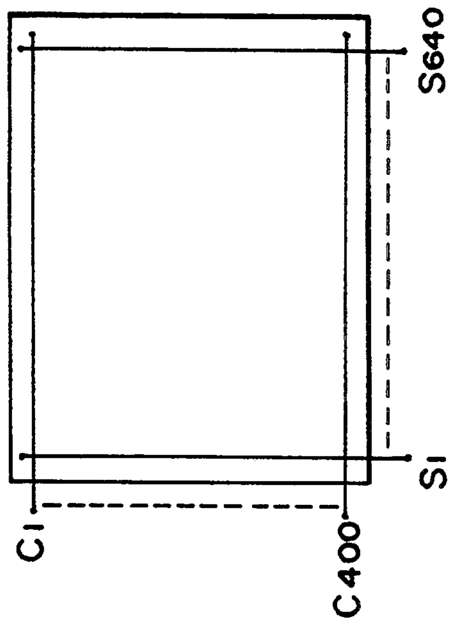
FIGS. 2A and 2B are schematic views for illustrating another embodiment of the liquid crystal driving method according to the present invention.
Figure 2B:
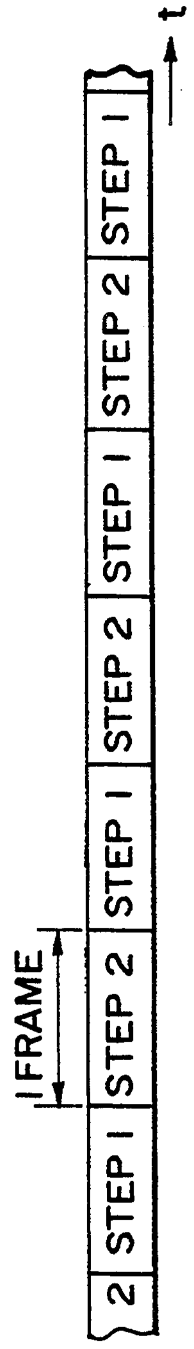
Figure 3A:
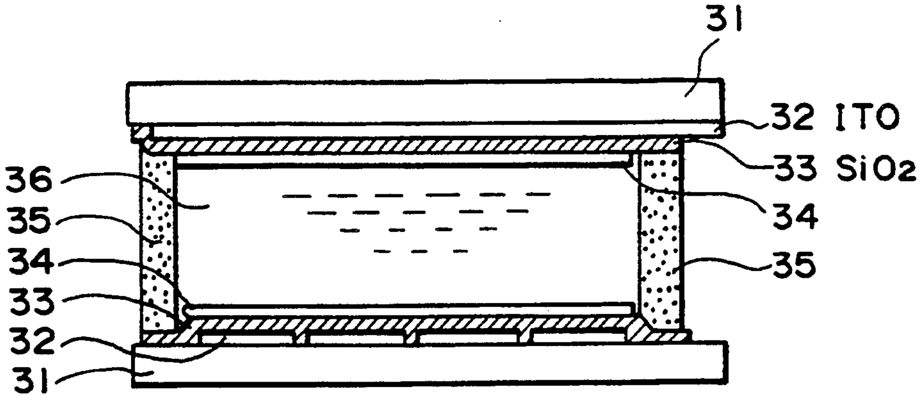
FIG. 3A PRIOR ART
FIG. 3A is a schematic sectional view of a conventional ferroelectric liquid crystal device.
Figure 3B:
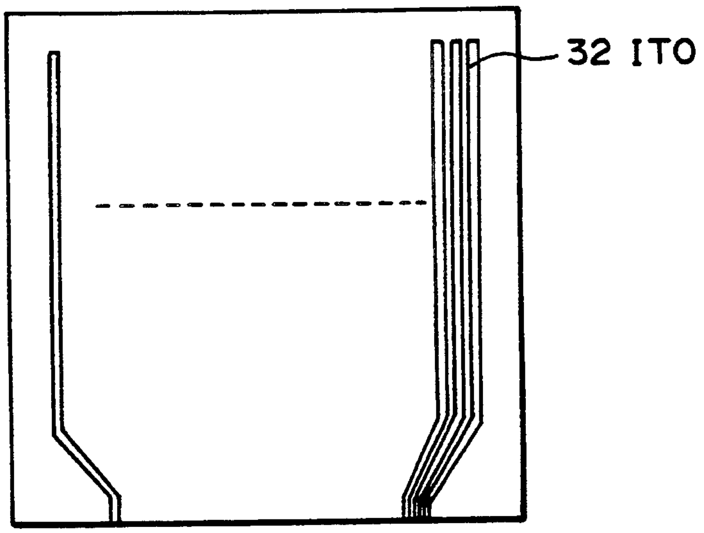
FIG. 3B PRIOR ART
FIG. 3B is a schematic plan view showing an example of an electrode pattern thereof.

This embodiment is directed to an application of the present invention to a binary state display. According to this embodiment, a display device (cell) comprising 400 scanning lines $C_1$–$C_{400}$ and 640 data signal lines $S_1$–$S_{640}$ as shown in FIG. 2A is driven by applying driving voltages which are changed for each frame scanning (of 400 lines) so that steps 1 and 2 as described in the previous embodiment are performed are alternating frames as shown in FIG. 2.

Figure 7B:
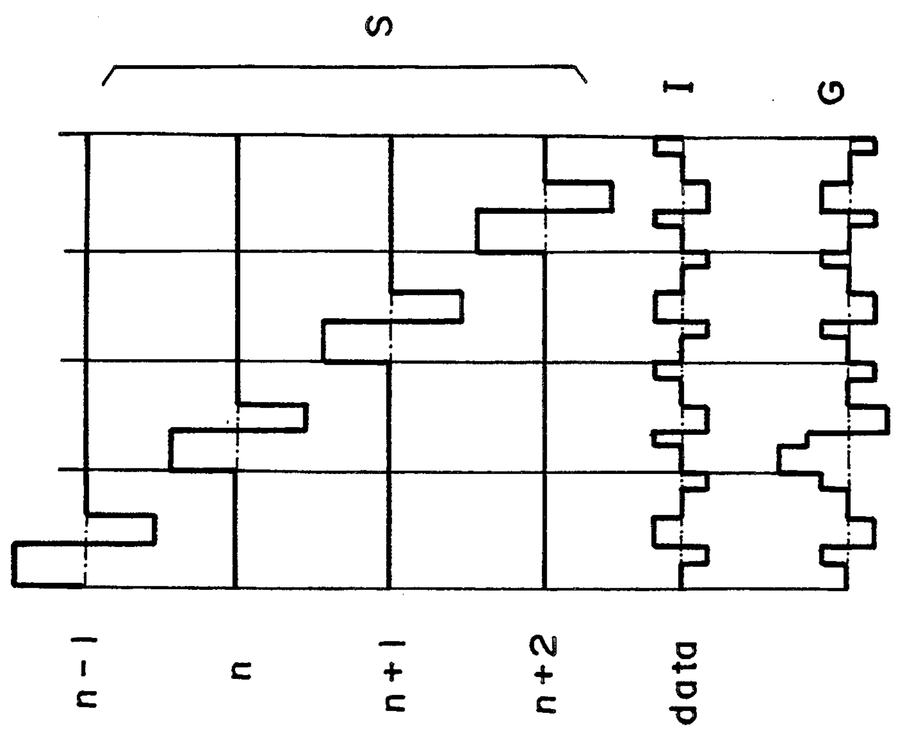
FIGS. 7A and 7B are waveform diagrams showing an example set of driving waveforms for the liquid crystal driving method according to the present invention.
Figure 7A:
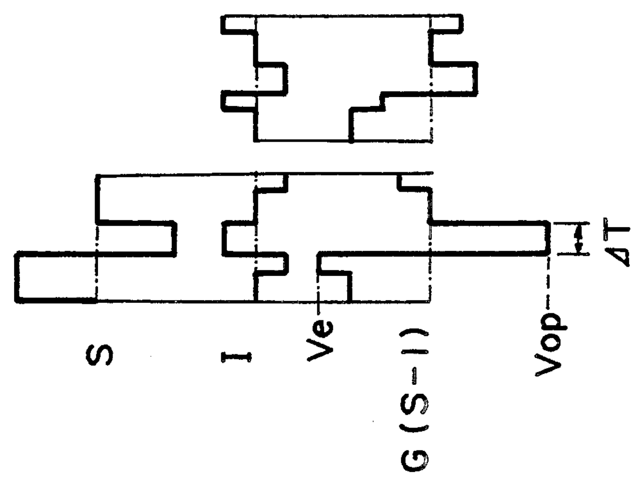

The liquid crystal device structure is the same as in the first embodiment except that the cell gap is uniformly 1.4 microns and the device is subjected to application of a set of driving voltage waveforms as shown in FIGS. 7A and 7B, which include a scanning signal S, data signals I, pixel signals G (=S−I), ΔT=40 μsec. a writing signal voltage Vop=17.4 volts in Step 1, a writing signal voltage Vop=16.1 volts in Step 2 and a clearing signal voltage Ve=22.0 volts (for only in Step 1).

This embodiment is effective for ensuring reliable writing over a wide liquid crystal device (a panel rather than a cell) having a certain difference in operation temperature, which also results in a difference in switching threshold voltages so that an entire panel cannot be written by a single writing signal voltage.

In a particular drive operation, an A4 size panel resulted in a temperature difference of 2° C. ranging from 34° C. to 36° C. due to a local difference in heat generated by the drive IC. In this case, the writing signal voltage Vop=17.4 volts was suitable for driving at a temperature of 34° C., and the writing signal voltage Vop=16.1 volts was suitable for driving at a temperature of 36° C. As a result of application of the above-described driving scheme using Ve=22.0 volts and V=17.4 volts in Step I and Vop=16.1 volts in Step 2 to the A4 size panel having a temperature difference of 2° C., a desired picture could be displayed over the entire panel.

However, when the above A4 size panel was driven applying FIGS. 7A and 7B waveforms involving a single writing step using Ve=22.0 volts and Vop=17.4 volts or Vop=16.1 volts, the A4 size panel caused a local disorder at a high-temperature part or a low-temperature part.

What is claimed is:

1. A liquid crystal driving method, comprising:

providing a liquid crystal device comprising a plurality of scanning electrodes, a plurality of data electrodes intersecting the scanning electrodes, and a bistable liquid crystal showing a first stable orientation state and a second stable orientation state disposed between the scanning electrodes and the data electrodes so as to form a pixel at each intersection of the scanning electrodes and the data electrodes, and writing steps for causing a selected pixel in an initial one of said first and second orientation states to show the first orientation state including:

a first step of applying a prescribed voltage signal sufficient to cause a pixel to show the second orientation state to the selected pixel and then applying to the selected pixel a voltage signal which is at least $V_1$ and less than $V_2$; and a second step of applying a voltage signal of at least $V_2$ to the selected pixel, wherein $V_1$ denotes a threshold voltage signal required for converting a pixel in the second orientation state into the first orientation state after applying the prescribed voltage signal when the initial state was the first orientation state, and $V_2$ denotes a threshold voltage signal required for converting a pixel in the second orientation state into the first orientation state after applying the prescribed voltage signal when the initial state was the second orientation state, and wherein a difference between $V_1$ and $V_2$ varies such that $V_1<V_2$ in the first step and $V_1$ and $V_2$ are substantially identical to each other in the second step.

2. A method according to claim 1, wherein said first and second steps are performed in this order respectively in successive two scanning times for the pixel.

3. A method according to claim 1, wherein the liquid crystal is a ferroelectric liquid crystal.

4. A liquid crystal driving method, comprising:

providing a liquid crystal device comprising a plurality of scanning electrodes, a plurality of data electrodes intersecting the scanning electrodes, and a bistable liquid crystal showing a first stable orientation state and a second stable orientation state disposed between the scanning electrodes and the data electrodes so as to form a pixel capable of forming gradation state depending on a voltage applied thereto at each intersection of the scanning electrodes and the data electrodes, and writing steps for causing a gradation level k in a pixel including:

a first step of applying a prescribed voltage for causing the second orientation state to the pixel and then applying a voltage of Va to the pixel, and a second step of applying a voltage Vb to the pixel, wherein Va denotes a voltage required for converting a pixel completely in the second orientation state into the gradation level K after applying the prescribed voltage for causing the second orientation state to the pixel completely in the first orientation state, and Vb denotes a voltage required for converting a pixel completely in the second orientation state into the gradation level k after applying the prescribed voltage for causing the second orientation state to the pixel completely in the second orientation state, the gradation level k representing an arbitrary gradation level between those given by a pixel fully in the first stable orientation state and a pixel fully in the second stable orientation state.

5. A method according to claim 4, wherein said first step is performed at a time when Va<Va and Vb are substantially identical to each other.

6. A method according to claim 4, wherein said first and second steps are performed in this order respectively in successive two scanning times for the pixel.

7. A method according to claim 4, wherein the liquid crystal is a ferroelectric liquid crystal.

8. A liquid crystal driving apparatus, comprising:

a liquid crystal device comprising a plurality of scanning electrodes, a plurality of data electrodes intersecting the scanning electrodes, and a bistable liquid crystal showing a first stable orientation state and a second stable orientation state disposed between the scanning electrodes and the data electrodes so as to form a pixel at each intersection of the scanning electrodes and the data electrodes, and drive means for causing a selected pixel in an initial one of said first and second orientation states to show the first orientation state in two steps including:

a first step of applying a prescribed voltage signal sufficient to cause a pixel to show the second orientation state to the selected pixel and then applying to the selected pixel a voltage signal which is at least $V_1$ and less than $V_2$, and a second step of applying a voltage signal of at least $V_2$ to the selected pixel, wherein $V_1$ denotes a threshold voltage signal required for converting a pixel in the second orientation state into the first orientation state after applying the prescribed voltage signal when the initial state was the first orientation state, and $V_2$ denotes a threshold voltage signal required for converting a pixel in the second orientation state into the first orientation state after applying the prescribed voltage signal when the initial state was the second orientation state, and wherein a difference between $V_1$ and $V_2$ varies such that $V_1<V_2$ in the first step and $V_1$ and $V_2$ are substantially identical to each other in the second step.

9. An apparatus according to claim 8, further comprising an image data source for supplying image data to the drive means.

10. An apparatus according to claim 8, wherein the first and second steps are performed in this order respectively in successive two scanning times for the pixel.

11. An apparatus according to claim 8, wherein said liquid crystal is a ferroelectric liquid crystal.

12. A liquid crystal driving apparatus, comprising:

a liquid crystal device comprising a plurality of scanning electrodes, a plurality of data electrodes intersecting the scanning electrodes, and a bistable liquid crystal showing a first stable orientation state and a second stable orientation state disposed between the scanning electrodes and the data electrodes so as to form a pixel capable of forming a gradation state depending on a voltage applied thereto at each intersection of the scanning electrodes and the data electrodes, and drive means for causing a gradation level k in a pixel in two steps including:

a first step of applying a prescribed voltage for causing the second orientation state to the pixel and then applying a voltage of Va to the pixel, and a second step of applying a voltage of Vb to the pixel, wherein Va denotes a voltage required for converting a pixel completely in the second orientation state into the gradation level k after applying the prescribed voltage for causing the second orientation state to the pixel completely in the first orientation state, and Vb denotes a voltage required for converting a pixel completely in the second orientation state into the gradation level k after applying the prescribed voltage for causing the second orientation state to the pixel completely in the second orientation state, the gradation level k representing an arbitrary gradation level between those given by a pixel fully in the first stable orientation state and a pixel fully in the second stable orientation state.

13. An apparatus according to claim 12, wherein the first step is performed at a time when Va<Vb and the second step is performed at a time when Va and Vb are substantially identical to each other.

14. An apparatus according to claim 12, further comprising an image data source for supplying image data to the drive means.

15. An apparatus according to claim 12, wherein the first and second steps are performed in this order respectively in successive two scanning times for the pixel.

16. An apparatus according to claim 12, wherein said liquid crystal is a ferroelectric liquid crystal.

17. A liquid crystal driving method, comprising:

providing a liquid crystal device comprising a plurality of scanning electrodes, a plurality of data electrodes intersecting the scanning electrodes, and a bistable liquid crystal showing a first stable orientation state and a second stable orientation state disposed between the scanning electrodes and the data electrodes so as to form a pixel capable of showing a gradation state depending on a voltage applied thereto at each intersection of the scanning electrodes and the data electrodes, and writing steps for causing a selected pixel completely in an initial one of said first and second orientation states to show a gradation level k state including:

a first step of applying a prescribed voltage signal, which is sufficient to cause a pixel to show completely the second orientation state, to the selected pixel and then applying a voltage signal of Va to the selected pixel, and a second step of applying a voltage signal of Vb to the selected pixel, wherein Va denotes a voltage signal required for converting a pixel completely in the second orientation state into the gradation level k state after applying the prescribed voltage signal when the initial state was completely the first orientation state, and Vb denotes a voltage signal required for converting a pixel completely in the second orientation state into the gradation level k state after applying the prescribed voltage signal when the initial state was completely the second orientation state, and wherein the gradation level k state represents an arbitrary gradation level between that of a pixel fully in the first stable orientation state and that of a pixel fully in the second stable orientation state.

18. A liquid crystal driving apparatus, comprising:

a liquid crystal device comprising a plurality of scanning electrodes, a plurality of data electrodes intersecting the scanning electrodes, and a bistable liquid crystal showing a first stable orientation state and a second stable orientation state disposed between the scanning electrodes and the data electrodes so as to form a pixel capable of showing a gradation state depending on a voltage applied thereto at each intersection of the scanning electrodes and the data electrodes, and drive means for causing a selected pixel completely in an initial one of said first and second orientation states to show a gradation level k state in two steps including:

a first step of applying a prescribed voltage signal, which is sufficient to cause a pixel to show completely the second orientation state, to the selected pixel and then applying a voltage signal of Va to the selected pixel, and a second step of applying a voltage signal of $V_b$ to the selected pixel, wherein Va denotes a voltage signal required for converting a pixel completely in the second orientation state into the gradation level k state after applying the prescribed voltage signal when the initial state was completely the first orientation state, and Vb denotes a voltage signal required for converting a pixel completely in the second orientation state into the gradation level k state after applying the prescribed voltage signal when the initial state was completely the second orientation state, and wherein the gradation level k state represents an arbitrary gradation level between that of a pixel fully in the first stable orientation state and that of a pixel fully in the second stable orientation state.

* * * * *

UNITED STATES PATENT AND TRADEMARK OFFICE
CERTIFICATE OF CORRECTION

PATENT NO. : 5,379,138

DATED : January 3, 1995

INVENTOR : Shinjiro Okada

It is certified that error appears in the above-identified patent and that said Letters Patent is hereby corrected as shown below:

COLUMN 2

Line 66, "Another" should read --another--.

COLUMN 3

Line 44, "accompanying" should read --accompanying drawings.--.

COLUMN 5

Line 35, "In" should read --In a--.

COLUMN 8

Line 22, "microns and the" should read --microns. The--.
Line 44, "Step I" should read --Step 1--.

UNITED STATES PATENT AND TRADEMARK OFFICE

CERTIFICATE OF CORRECTION

PATENT NO. : 5,379,138

DATED : January 3, 1995

INVENTOR : Shinjiro Okada

It is certified that error appears in the above-identified patent and that said Letters Patent is hereby corrected as shown below:

COLUMN 9

Line 47, "level K" should read --level k--.
Line 61, "Va<Va and Vb" should read --Va<Vb and said second step is performed at a time when Va and Vb--.

Signed and Sealed this

Thirtieth Day of May, 1995

Attest:

BRUCE LEHMAN

*Attesting Officer*

*Commissioner of Patents and Trademarks*